Dec. 28, 1965

J. O. ELLIOTT ETAL 3,226,620

STARTING ARRANGEMENT

Filed Aug. 16, 1962

INVENTORS
JAMES O. ELLIOTT
DANIEL L. FRANK
ROBERT W. LELAND

BY *Albert H. Reuther*

THEIR ATTORNEY

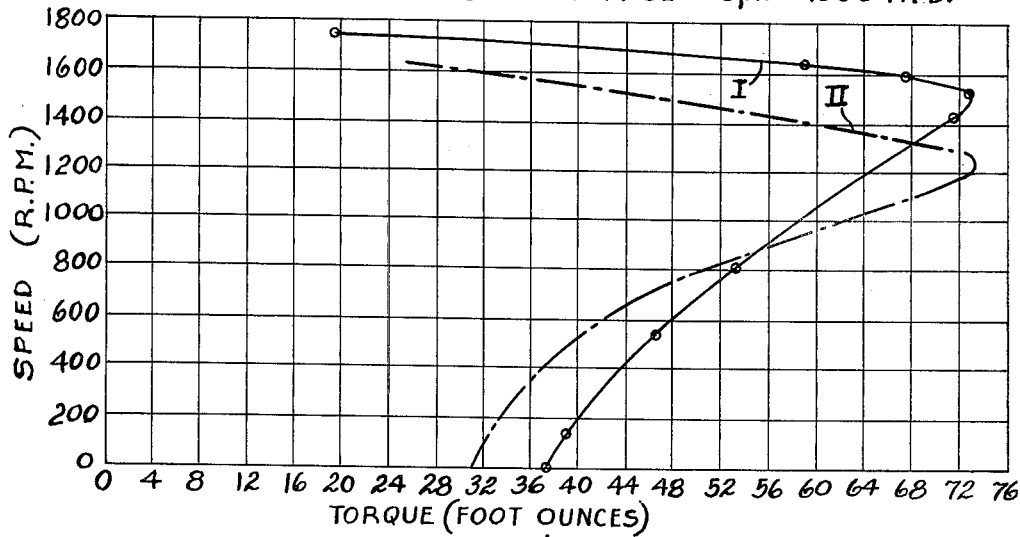
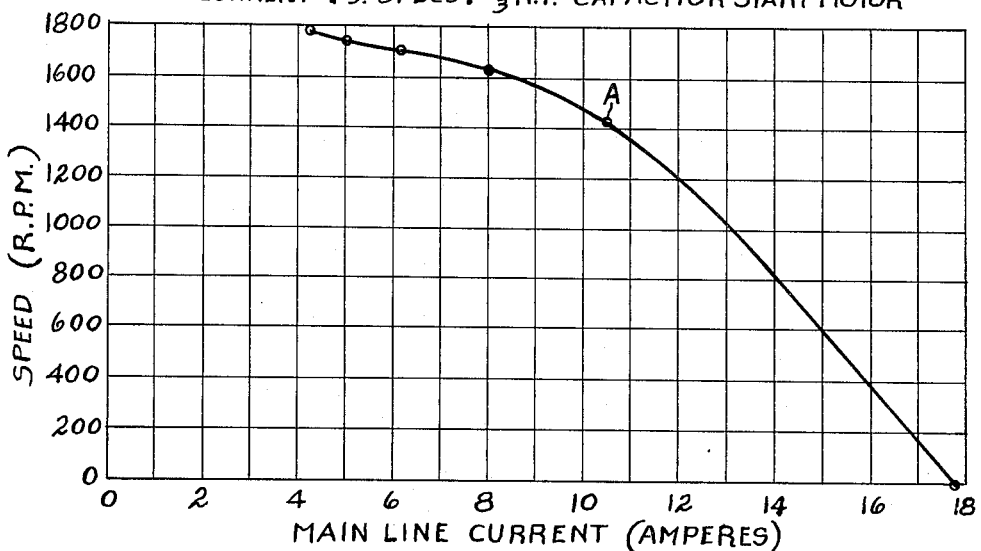

3,226,620
STARTING ARRANGEMENT
James O. Elliott, Daniel L. Frank, and Robert W. Leland,
Dayton, Ohio, assignors to General Motors Corporation, Detroit, Mich., a corporation of Delaware
Filed Aug. 16, 1962, Ser. No. 217,419
3 Claims. (Cl. 318—221)

This invention relates to an improved starting arrangement for electrical devices, and, more particularly, to static control of supply of power between out-of-phase portions for starting purposes.

An object of this invention is to provide a new and improved static starting arrangement in which semi-conductor means can allow direct switching of phase winding current of an electrical device such as a motor in accordance with main field current pulsing while eliminating such problems as pitting of switch contacts as well as mechanical failure encountered on switching devices including centrifugally and mechanically shifted components.

Another object of this invention is to provide a starting arrangement for a motor including a rotor means as well as main and phase winding portions of stator means supplied with power from an alternating current source subject to provision of a primary portion of current transformer means in series with the main winding portion of the motor so that a pair of secondary transformer portions alternately effect gate-triggering of a pair of solid state switching devices such as silicon control rectifier means in parallel and opposing directions by signals proportional to main field current.

Another object of this invention is to provide a stator motor starting switch arrangement for single-phase capacitor-start motor means including a rotor portion as well as main and phase winding portions and a capacitor means for phase shift subject to switching accomplished by means of two semi-conductor or solid state silicon control rectifier devices connected in parallel and opposing directions in a phase supply line in which powering is accomplished in a predetermined wave form by gated firing of the semi-conductor devices in response to signals proportional to main field current in accordance with energy transmission by current transformer means having a primary portion connected in series with the main winding portion and a pair of secondary portions each to have an impedance for cut of voltage peak in parallel therewith to supply a gate-triggering impulse in response to which the semi-conductor devices are alternately operative to allow passage of relatively larger starting current in series through the capacitor means and phase winding portion.

A further object of this invention is to provide a static motor starting switch arrangement for split-phase motor means including a rotor portion as well as main and phase winding portions subject to energization in accordance with alternate gate-triggering of a pair of semi-conductor or solid state silicon control rectifier devices connected in parallel and opposing directions in a phase supply line in which powering is accomplished in a predetermined wave form by gated firing of the semi-conductor devices in response to signals proportional to main field current in accordance with energy transmission by current transformer means having a primary portion connected in series with the main winding portion and a pair of secondary portions each to have an impedance means including a resistance for cut of voltage peak in parallel therewith and each to have a capacitor means for performance rating and operating efficiency as to signal time to the semi-conductor gate-triggering in series therewith such that the semi-conductor devices are alternately operative to allow passage of relatively larger starting current to the phase winding portion.

Another object of this invention is to provide a static starting system for an electric motor means having a rotor portion as well as main and phase winding portions in which starting current supply is controlled by triggering of a pair of back-to-back connected semi-conductor devices each gated to fire in response to predetermined current transformer transmitted signals in proportion to main field current and having impedance means between current transformer secondaries and semi-conductor gate connections to include at least resistance means for cut of peak voltage as well as optional capacitor means in series to enhance torque and operating efficiency of the motor means for use on refrigeration compressor means and the like.

Further objects and advantages of the present invention will be apparent from the following description, reference being had to the accompanying drawings wherein preferred embodiments of the present invention are clearly shown.

FIGURE 3 provides an example of speed versus torque performance of a capacitor-start motor means using a static semi-conductor starting arrangement therewith.

FIGURE 4 exemplifies graphically a relationship of main field current versus speed values for capacitor motor means and starting arrangement having the performance indicated in FIGURE 3.

On centrifugally and mechanically shifted switching devices there can be considerable servicing required due to contact pitting and arcing as well as mechanical or structural failures due to repeated on-off movements. Previously, motor means have been started with snap acting speed responsive devices such as disclosed by 2,747,854—Schnepf and 2,762,900—Shewmon both belonging to the assignee of the present invention. However, to provide a more compact motor installation on refrigeration means such as air conditioner compressors and the like, it is desirable to avoid servicing of starting components and also to enhance reliability while avoiding and eliminating contact pitting and the like. The present invention provides an unique solid state switching arrangement which retains advantages of functioning in accordance with speed charteristics of a motor means used to drive a load such as a refrigeration compressor and the like.

Figure 1:
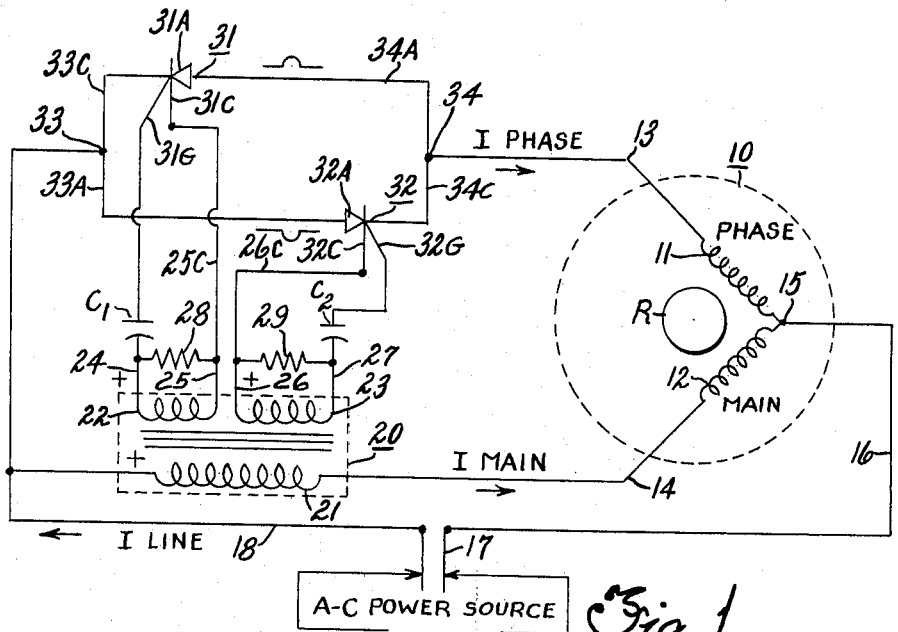
FIGURE 1 illustrates a starting arrangement utilizing semi-conductor devices for one type of motor means.

FIGURE 1 illustrates a motor means generally indicated by numeral 10 including a phase winding portion 11 and a main winding portion 12 electrically energizable to effect movement of a rotor R in a well-known manner. The motor means 10 can be a so-called "split-phase" machine with a phase lead connection 13 to one end of the phase winding portion 11 and a main lead connection 14 also to one end of the main winding portion 12. A juncture 15 is provided to interconnect ends of the phase winding portion 11 and main winding portion 12 to a power supply line 16 energized with line voltage from an A.C. power source 17 also connected to a further supply line 18.

In accordance with the present invention, there is provided a current transformer means generally indicated by numeral 20 including a primary portion 21 having one end thereof joined to the supply line 18 and an opposite end thereof joined to the lead or connection 14 for the main winding portion 12 of the motor means 10. The transformer means 20 further includes a pair of secondary portions 22 and 23 having turns of wiring coupled magnetically with the primary portion 21 to provide a stepdown voltage of alternating current power emanating from leads 24–25 and 26–27 of the secondary transformer portions 22–23, respectively. To cut peak voltage emanating from these lines 24–25 and 26–27, each of the secondary transformer portions has parallel connection to impedance means such as resistance 28 and resistance 29, respectively, as can be seen in FIGURE 1. The primary and secondary transformer portions transmit signals or A.C. pulses proportional to the main field current which passes through the lead 14 to the main winding portion 12 of the motor means 10.

Further in accordance with the present invention, there is provided a pair of semi-conductor devices or silicon controlled rectifier (SCR) means generally indicated by reference numerals 31 and 32 each having an anode portion such as 31A and 32A, respectively. Each of the semi-conductor devices also includes a gate portion such as 31G and 32G designating lead connections thereto as well as a cathode portion 31C and a cathode portion 32C represented in FIGURE 1. The semi-conductor devices or SCR means 31 and 32 are connected in parallel and opposing directions such that the supply line 18 is joined thereto at a connection or juncture 33 having a lead wire 33C joined to the cathode 31C of the semi-conductor device 31 and a lead wire 33A joined to the anode 32A of the semi-conductor device or SCR means 32.

Similarly, the lead connection 13 from the phase winding portion 11 is joined to a connection or juncture 34 having a lead connection 34A to the anode 31A of the semi-conductor means 31 and a lead connection 34C to the cathode portion 32C of the semi-conductor device or SCR means 32. This back-to-back connection of semi-conductor means or SCR devices 31 and 32 is such that there is an alternate blocking of flow of phase current through the line connection 18 by way of the junctures 33 and 34 to the lead 13 and in accordance with the present invention, the signals proportional to main field current through the primary transformer portion 21 can be transmitted through the secondary transformer portions 22 and 23 for triggering and alternately firing the semi-conductor devices 31 and 32 by way of the following circuit connections. A capacitor means $C_1$ is connected in series by a suitable lead to the gate portion 31G connection of the semi-conductor device 31 from a juncture of the lead 24 and one end connection from the impedance or resistance means 28. A lead 25C is connected to the cathode portion 31C of the semi-conductor means or SCR device 31 from a juncture of an opposite end of the resistance means 28 and the secondary transformer lead 25. Further capacitance means $C_2$ is connected from a juncture of one end of resistance means 29 and lead wire 27 from the secondary transformer portion 23 to a series connection with the gate portion 32G of the semi-conductor means or SCR device 32. A lead 26C is connected between the cathode portion 32C and a juncture from one end of the resistance means 29 and the lead connection 26 from one side of the secondary transformer portion 23. Use of the capacitance means $C_1$ and $C_2$ in series with the gate-triggering of the semi-conductor devices 31 and 32, respectively, can avoid loss of torque and can improve performance rating and operating efficiency. Selection of the capacitor means determines the timing of the gate signal with respect to the main winding current thereby effecting a shift in phase angle and permitting alternate half-wave firing of the semi-conductor devices to permit passage of a complete alternating current wave form to the phase winding portion 11. As is well known, the capacitance means will effect a leading current characteristic while the inductance or combined resistive and conductive impedance of the main winding circuit portion lags that of the phase powering.

Figure 2:
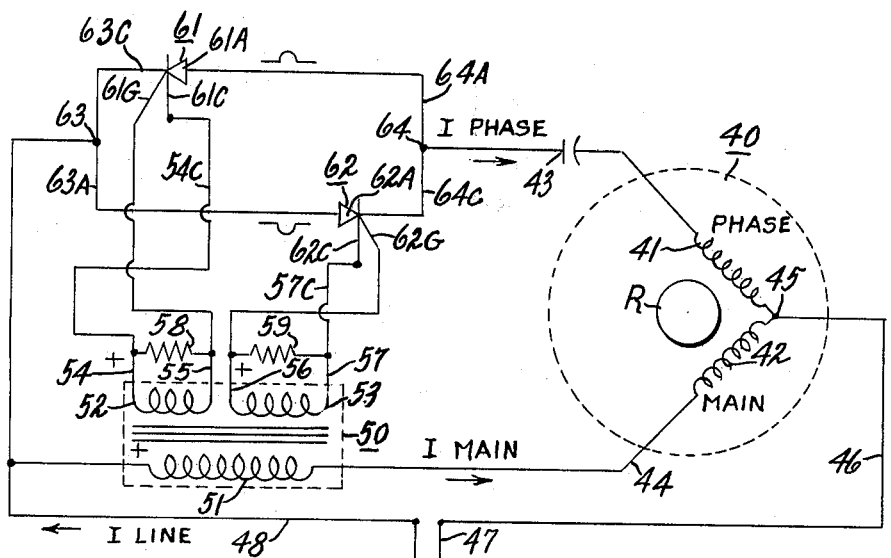
FIGURE 2 illustrates a starting arrangement also utilizing semi-conductor devices for another type of motor means.

FIGURE 2 illustrates a starting arrangement similar to that of FIGURE 1 also utilizing semi-conductor devices but for a capacitor-start motor means rather than a split-phase motor means. This capacitor-start motor means is generally indicated by numeral 40 in FIGURE 2 and includes a phase winding portion 41 as well as a main winding portion 42 and a rotor portion R to drive a load in a well-known manner. A capacitance means 43 is connected in series with the phase winding portion 41 and a lead or connection 44 similar to the connection 14 of FIGURE 1 is provided in the circuit of FIGURE 2. The phase winding portion 41 and the main winding portion 42 are connected to each other at one end at a junction 45 to which a supply line 46 provides electrical energization from an A.C. power source 47. Line voltage from this A.C. power source 47 is also applied to a lead or connection 48 having one end joined to the power source and also connected to the starting system including the components noted earlier except for minor change in connections. In FIGURE 2, there is a current transformer means generally indicated by numeral 50 having a primary winding portion 51 as well as a pair of secondary winding portions 52 and 53. There are lead connections 54 and 55 joined to opposite ends of the secondary winding portion 52 and also lead connections 56 and 57 joined to opposite ends of the secondary winding portion 53. Resistance means 58 and 59 are connected across these leads 54–55 and 56–57, respectively, as impedance for cutting peak voltage from the secondary transformer portions 52 and 53, respectively. For the capacitor-start motor means 40, it is possible to leave out the capacitance means $C_1$ and $C_2$ used in the circuit of FIGURE 1. The starting arrangement or system of FIGURE 2 utilizes a pair of semi-conductor means or silicon controlled rectifier (SCR) devices generally indicated by numerals 61 and 62 having anode portions 61A and 62A as well as connections to gate portions 61G and 62G. Each semi-conductor means or SCR device also includes a cathode portion 61C for SCR device 61 and 62C for SCR device 62. At a juncture 63 there is an interconnection of the lead 48 with a wire 63C joined to the cathode portion 61C of the SCR device 61 and also a connection to a lead 63A to the anode portion 62A of the SCR device 62. Similarly, a junction 64 is provided from the series connected capacitor means 43 for starting of the motor means 40 and a lead 64A interconnects this junction and the anode portion 61A of the SCR device 61. A lead 64C interconnects the junction 64 with the cathode portion 62C of the SCR device 62. For the starting arrangement of FIGURE 2, there is a reversal of leads interconnecting the secondary transformer portions and the semi-conductor means or SCR devices. This reversal of leads effects provision of an inverted gate as compared with the gate or triggering provided for the starting arrangement or system of FIGURE 1. Thus, a lead 57C interconnects the cathode portion 62C with a juncture of one end of the impedance or resistance means 59 and lead 57 from the secondary transformer portion 53. Similarly, a lead 54C is joined to the cathode portion 61C and a juncture of the lead 54 and one end connection from the impedance or resistance means 58. A suitable lead connection to each of the gate portions 61G and 62G provided from a juncture of an opposite end of the impedance or resistance means 58 and 59 would be leads 55 and 56, respectively. The back-to-back relationship of the semi-conductor means or SCR devices 61 and 62 is such that alternately portions of wave forms of A.C. power are permitted to pass and timing of the triggered gating of the SCR devices is such that a full wave form of phase current is permitted to pass to the series connected capacitor means 43 and phase winding portion 41. The capacitor 43 as series connected effects a leading phase current approximately 90° ahead of the main winding or field current that passes through the primary transformer portion 51 and the main winding portion 42.

The starting arrangement using semi-conductor means or silicon controlled rectifier devices in combination with current transformer means to signal and trigger gates in accordance with main field current and proportional thereto completely eliminates any necessity of a centrifugal switching means or mechanically movable switching device. The two silicon control rectifier devices are alternately gated by a relatively small magnitude of current transmitted from the transformer means and provision can be made according to the voltage ratings of the semi-conductor devices for a reduced voltage supply thereto if necessary. However, recent developments have permitted manufacture of such semi-conductor devices for withstanding greater power up to 150 amperes and 500 volts. For one cycle surge current ratings there are even such devices available which can carry up to 3,000 amperes. Also there are silicon controlled rectifier devices available having a gate sensitivity requiring only 50 microamperes gate current to fire with a capacity or capability of blocking up to 400 volts repetitively though accommodating a surge of up to 18 amperes current. As further background information, it can be noted that silicon controlled rectifier devices utilize a PNP silicon wafer having a central layer of N type silicon with two P layers diffused into the surfaces thereof. In addition, the SCR device has a cathode portion or connection formed of a PN junction and the gate lead is attached to the diffused P. Thus, in effect, the SCR device is a PNPN layering of materials with an added connection being brought out from the diffused P layer as the gate lead. A bar or box-like series of four squares can be labelled alternately PNPN to represent such an SCR device and one of the distinguishing features thereof over so-called "transistors" can be the increased current carrying capacity and power ratings that can be handled thereby where so-called "transistors" had limitations as to use with installations having greater power and current carrying capacity. Nomenclature for transistor devices and lead connections thereto can be noted for comparable portions such as designating as an emitter for a transistor what is a cathode for the SCR device. Similarly, a base for a transistor is comparable electrically to a gate for an SCR device and the collector of a transistor is comparable to an anode for an SCR device. Both transistor and SCR devices can be termed semi-conductor or solid state switching means. However, an SCR device which has a PNPN structure can be, in effect, a combination of both a PNP and an NPN transistor means with a common collection junction. Use of the silicon controlled rectifier devices in the starting arrangement or system in accordance with the present invention allows direct switching of phase winding current while eliminating such problems as contact pitting as well as mechanical failure problems.

The secondary portions of the transformer means are connected with the proper phase relation to accomplish firing of the silicon controlled rectifier devices. The voltage supplied to the phase winding can be sinusoidal if the SCR devices such as 31–32 and 61–62 are gated properly.

FIGURE 3 illustrates characteristics of a one-third horsepower capacitor-start motor means representing, for example, application of 125 volts applied to both main and phase windings with a 125 microfarad capacitor means such as 43 indicated in FIGURE 2 in series with the phase winding portion 41. A curve with a label I represents the speed versus torque values for this motor means having 125 volts applied to both windings. A curve represented by a label II represents use of 125 volts on a main winding portion and 50 volts on a phase winding portion with a starting capacitance means of 1,000 microfarads if a reduced voltage of 50 volts is applied to the phase winding means. FIGURE 4 exemplifies graphically a relationship of main field current versus speed values for this same capacitor motor means and starting arrangement. The main field current for this particular motor means cited as an example went to 17.8 amperes. This amperage is more than sufficient to fire or gate "on" the silicon control rectifier devices such as 31–32 and 61–62 which permit application of the secondary voltage of the transformer means or of power supply to the phase winding portion. By proper selection of the turns-ratio of the current transformer means, the gating signals across the secondary portions of the transformer means drop below the minimum sustaining value needed to keep the silicon controlled rectifier devices "on" at a point A along the curve of FIGURE 4. Accurate control of the switching point depends upon proper determination of the turns-ratio and since it is apparent from the curve of FIGURE 4 that main field current is a function of motor speed, it is possible to utilize sensing of this current as a measure of the speed of the motor and in this manner control application of and removal of the phase winding portion of the motor means at definite speed points.

Physically, the combination of semi-conductor devices and current transformer means as well as the impedances including the resistances and capacitances can be made into a compact and relatively small unit which can be readily mounted on or adjacent to a motor means for starting purposes. Mechanical shift and movement and also arcing of contacts can be eliminated for greater reliability.

While the embodiments of the invention as herein disclosed constitute preferred forms, it is to be understood that other forms might be adopted.

What is claimed is as follows:

1. In a starting arrangement having a motor means with a rotor portion as well as phase and main inductive winding portions energized from a power source through connections including an inductive transformer means having a primary portion in series with the main winding portion as well as a pair of secondary transformer portions each having a resistance means connected across output thereof to a pair of back-to-back connected semi-conductor means triggered by signals from said inductive transformer means during start energization of said inductive winding portions, the improvement which comprises a starting capacitance means in series with said phase winding portion both for starting phase shift and for offset of lagging electrical characteristic due to said inductive transformer means and said inductive winding portions which together cause difficulty in properly triggered relationship of the back-to-back connected semi-conductor means, said capacitance means having connection to one side thereof directly to back-to-back semi-conductor means output connection.

2. In a starting arrangement having a split phase motor means with a rotor portion as well as phase and main inductive winding portions energized from a power source through connections including an inductive transformer means having a primary portion in series with the main winding portion as well as a pair of secondary transformer portions each having a resistance means connected across output thereof to a pair of back-to-back connected semi-conductor means triggered by signals from said inductive transformer means during start energization of said inductive winding portions, the improvement which comprises a pair of capacitance means corresponding to said back-to-back connected semi-conductor means directly in series connection thereto from juncture with corresponding resistance means across output of each secondary transformer portion, each of said pair of capacitance means having a predetermined rating that offsets lagging electrical characteristic due to said inductive transformer means and said inductive winding portions which only inductively together cause difficulty in properly triggered relationship of the back-to-back connected semi-conductor means, said pair of capacitance means thus overcoming loss of torque accompanied by improved performance rating and operating efficiency closer to unity power factor condition.

3. In a starting system for use in combination with a split phase motor means having a rotor portion as well as phase and main inductive winding portions energized from a power source through connections including an inductive transformer means having a primary portion in series with the main winding portion as well as a pair of secondary transformer portions each having a resistance means connected across output thereof to a pair of back-to-back connected semi-conductor means triggered by signals from said inductive transformer means during start energization of said inductive winding portions, the combination therewith of a pair of capacitive impedance means corresponding to said back-to-back connected semi-conductor means directly in series connection thereto from juncture with corresponding resistance means across output of each secondary transformer portion, each of said pair of capacitive impedance means having a predetermined rating in establishment of leading electrical characteristic that substantially offsets lagging electrical characteristic due to said inductive transformer means and said inductive winding portions which only inductively together cause difficulty in properly triggered relationship of the back-to-back connected semi-conductor means, said pair of capacitive impedance means with leading electrical characteristic having said series connection directly to gating respectively of said back-to-back connected semi-conductor means thus timed more accurately in the gate signal with respect to otherwise lagging inductive main winding current compensated by said pair of capacitive impedance means that effect a shift in phase angle accompanied by substantially accurate alternate half-wave firing of the semi-conductor means and accompanied by improved performance rating and operating efficiency closer to unity power factor conditions thus improving torque available in the split phase motor means.

References Cited by the Examiner
UNITED STATES PATENTS 3,071,717   1/1963   Gordon _____ 318—221

JOHN F. COUCH, *Primary Examiner.*

O. L. RADER, *Examiner.*

C. E. ROHRER, *Assistant Examiner.*